United States Patent
Hofmann et al.

[11] Patent Number: 5,911,425
[45] Date of Patent: Jun. 15, 1999

[54] STEERING KNUCKLE ASSEMBLY FOR AUTOMOTIVE VEHICLES

[75] Inventors: Heinrich Hofmann, Schweinfurt; Rolf-Dieter Betzer, Eschborn; Rolf Weiler, Eppstein, all of Germany

[73] Assignee: ITT Automotive Europe GmbH, Germany

[21] Appl. No.: 08/535,265

[22] PCT Filed: Apr. 21, 1994

[86] PCT No.: PCT/EP94/01242

§ 371 Date: Jan. 5, 1996

§ 102(e) Date: Jan. 5, 1996

[87] PCT Pub. No.: WO94/25771

PCT Pub. Date: Nov. 10, 1994

[30] Foreign Application Priority Data

Apr. 30, 1993 [DE] Germany ............................ 43 14 311

[51] Int. Cl.⁶ .................................................. B62D 7/06
[52] U.S. Cl. .................................. 280/93.512; 188/18 A; 280/124.125
[58] Field of Search .................. 280/96.1, 93, 95.1, 280/124.11, 124.125, 124.116, 93.512; 188/18 A

[56] References Cited

U.S. PATENT DOCUMENTS

| | | |
|---|---|---|
| 3,298,468 | 1/1967 | Buyze . |
| 4,084,665 | 4/1978 | Burnett ................................ 188/73.45 |
| 4,096,926 | 6/1978 | Klaue . |
| 4,480,383 | 11/1984 | Yoshioka et al. . |
| 4,621,700 | 11/1986 | Merkelbach . |
| 4,722,540 | 2/1988 | Kozyra et al. ............................ 280/93 |
| 5,458,352 | 10/1995 | Lederman ............................ 280/96.1 |

FOREIGN PATENT DOCUMENTS

| | | |
|---|---|---|
| 2220394 | 10/1974 | France . |
| 2482014 | 11/1981 | France . |
| 2482016 | 11/1981 | France . |
| 1450159 | 9/1964 | Germany . |
| 2148797 | 4/1973 | Germany . |
| 2517523 | 11/1976 | Germany . |
| 3010726 | 3/1980 | Germany . |
| 3044185 | 6/1981 | Germany . |
| 3132117 | 8/1981 | Germany . |

(List continued on next page.)

OTHER PUBLICATIONS

English Translation of the International Preliminary Examination Report for Application PCT/EP94/01242.

Primary Examiner—Eric D. Culbreth
Attorney, Agent, or Firm—Rader, Fishman & Grauer PLLC

[57] ABSTRACT

A steering knuckle assembly for the drive wheels of automotive vehicles including a carrier component adapted to be secured to the wheel suspension and carrying a floating-caliper brake and a wheel axle bearing, and a rotatably mounted wheel axle having a constant-velocity joint for the drive and a flange for the attachment of a brake disc. According to the present invention, the carrier component with the disc brake and the wheel axle bearing together with the wheel axle, the flange, the brake disc and a bowl shaped part of the constant-velocity joint are coupled to form a module which can be secured to the wheel suspension as a preassembled unit in the final assembly of the automotive vehicle. The carrier component is preferably formed integrally with supporting arms for the disc brake, fastening sections for the wheel suspension and a lever for the steering, on the one hand, and a radially internal ring of the wheel axle bearing, a shell-shaped part of the constant-velocity joint and the flange for attaching the brake disc are formed integrally with the wheel axle, on the other hand.

10 Claims, 2 Drawing Sheets

FOREIGN PATENT DOCUMENTS

| | | |
|---|---|---|
| 3311106 | 3/1983 | Germany . |
| 3342519 | 11/1983 | Germany . |
| 3222733 | 12/1983 | Germany . |
| 3244741 | 6/1984 | Germany . |
| 3736666 | 10/1987 | Germany . |
| 3700564 | 11/1987 | Germany . |
| 3743124 | 12/1987 | Germany . |
| 3931868 | 9/1989 | Germany . |
| 4301195 | 1/1993 | Germany . |
| 35279 | 1/1991 | Japan . |
| 1480068 | 7/1977 | United Kingdom . |
| 1481687 | 8/1977 | United Kingdom . |
| 1481688 | 8/1977 | United Kingdom . |
| 2009682 | 6/1979 | United Kingdom . |
| WO94/25771 | 4/1994 | WIPO .................................. 280/95.1 |

STEERING KNUCKLE ASSEMBLY FOR AUTOMOTIVE VEHICLES

TECHNICAL FIELD

The present invention relates to steering knuckles for vehicles and more particularly relates to a steering knuckle assembly for the drive wheels of automotive vehicles.

BACKGROUND OF THE INVENTION

A generic steering knuckle assembly is disclosed in German patent application No. 30 44 185. This known steering knuckle assembly comprises a relatively large number of individual parts which must be coupled to each other requiring considerable mounting effort. Additional component parts are necessary as coupling means. This fact increases not only the manufacturing cost but also the weight of the steering knuckle assembly.

Further, attempts have generally been made to minimize the complexity of the final assembly of the vehicle to the greatest possible extent. Therefore, it is considered disadvantageous that a disc brake or a constant-velocity joint for the wheel drive must still be mounted after the attachment of a carrier part of a steering knuckle assembly to the wheel suspension of the automotive vehicle.

An object of the present invention is to improve a steering knuckle assembly of the generic type such as to achieve low weight and a simple assembly, and it is desired to reduce the complexity of the final assembly on the automotive vehicle in particular.

This object of the present invention is achieved by the coupling majority of the parts of the steering knuckle assembly to form a module which is readily preassembled and supplied as a unit by a subsupplier to the car maker. Only few operations are required in the final assembly of the vehicle to attach the preassembled unit to the wheel suspension of the vehicle.

Favorable embodiments are disclosed which particularly reduce the number of parts and the weight of the steering knuckle assembly.

In a preferred embodiment, the supporting arms of the floating-caliper disc brake are integrated in one piece into the carrier component of the steering knuckle assembly. This removes the effort needed for attaching the supporting arms to the carrier component and the need for fastening screws. All functions of a brake carrier are integrated in the carrier component if, the floating caliper is displaceably guided on the supporting arms.

In a preferred embodiment, the radially external ring of the wheel axle bearing is attached by being pressed into the carrier component. Additional fastening provisions are not required. Another favorable embodiment includes integrally forming a radially internal ring of the wheel axle bearing with the rotating axle member.

Favorable aspects with respect to a simple design of the axle member include integrally forming a part of the constant-velocity joint or a flange (which functions to attach the brake disc) with the wheel axle.

Advantageous embodiments of the carrier component are disclosed, wherein one or a plurality of fastening sections of the carrier component or, in the case of a steered vehicle wheel, a lever for steering, are provided and preferably designed integrally with the carrier component. Further improvements are disclosed such as designing the carrier component as a casting in a simple and low-cost fashion.

DETAILED DESCRIPTION OF THE PREFERRED EMBODIMENTS

Figure 1:
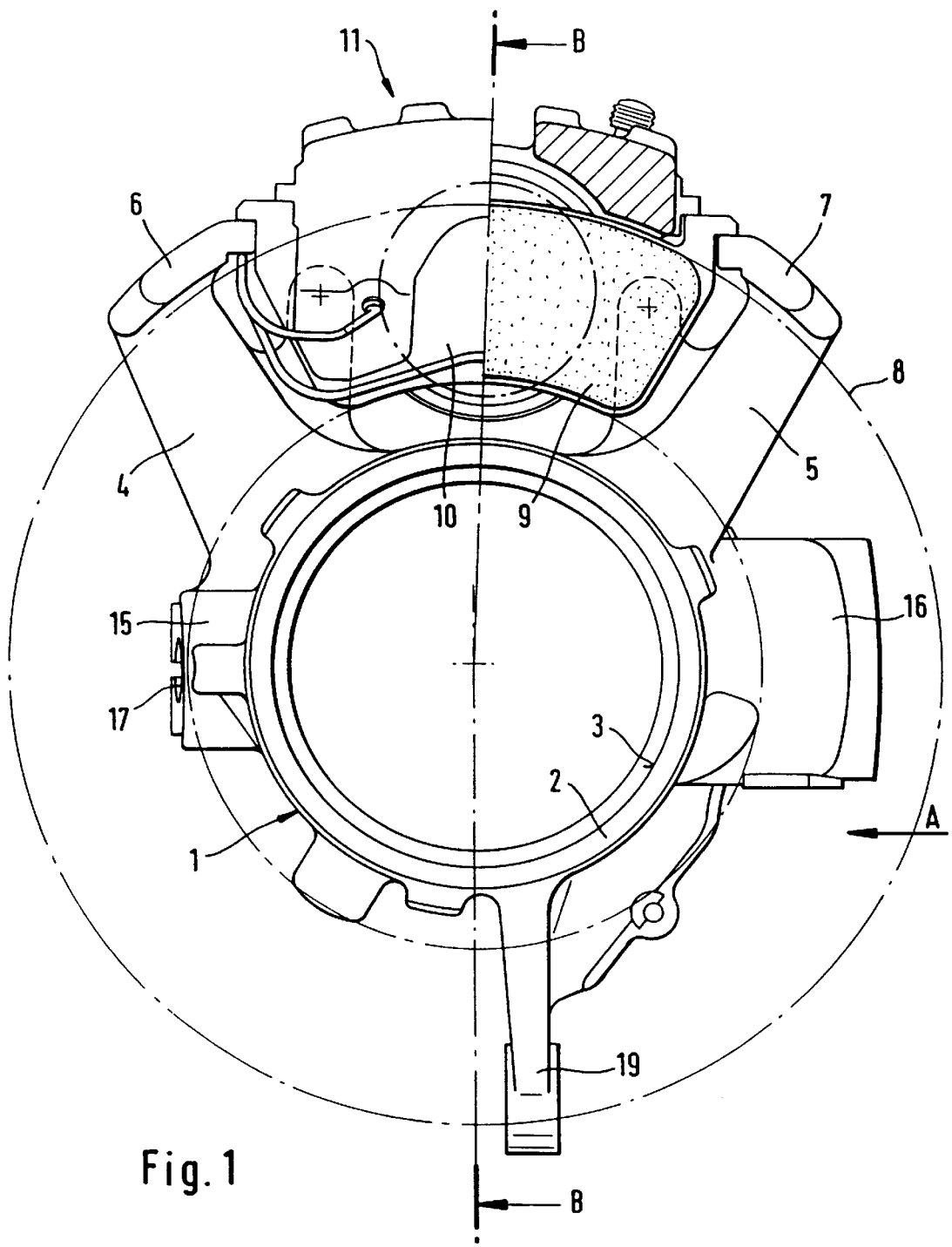
FIG. 1 is a partial cross-sectional top view of a casting of a steering knuckle assembly according to the present invention along with a floating-caliper disc brake.

FIG. 1 shows a carrier component 1 including a substantially annular central section 2 and a central bore 3. Two supporting arms 4, 5 extend initially from the central section 2 in a radial direction outwardly up to the external edge of a brake disc 8, shown in broken lines. The supporting arms 4, 5 are deflected in this area and project with guiding portions 6, 7 in an axial direction beyond the edge of the brake disc 8.

Figures 2, 3:
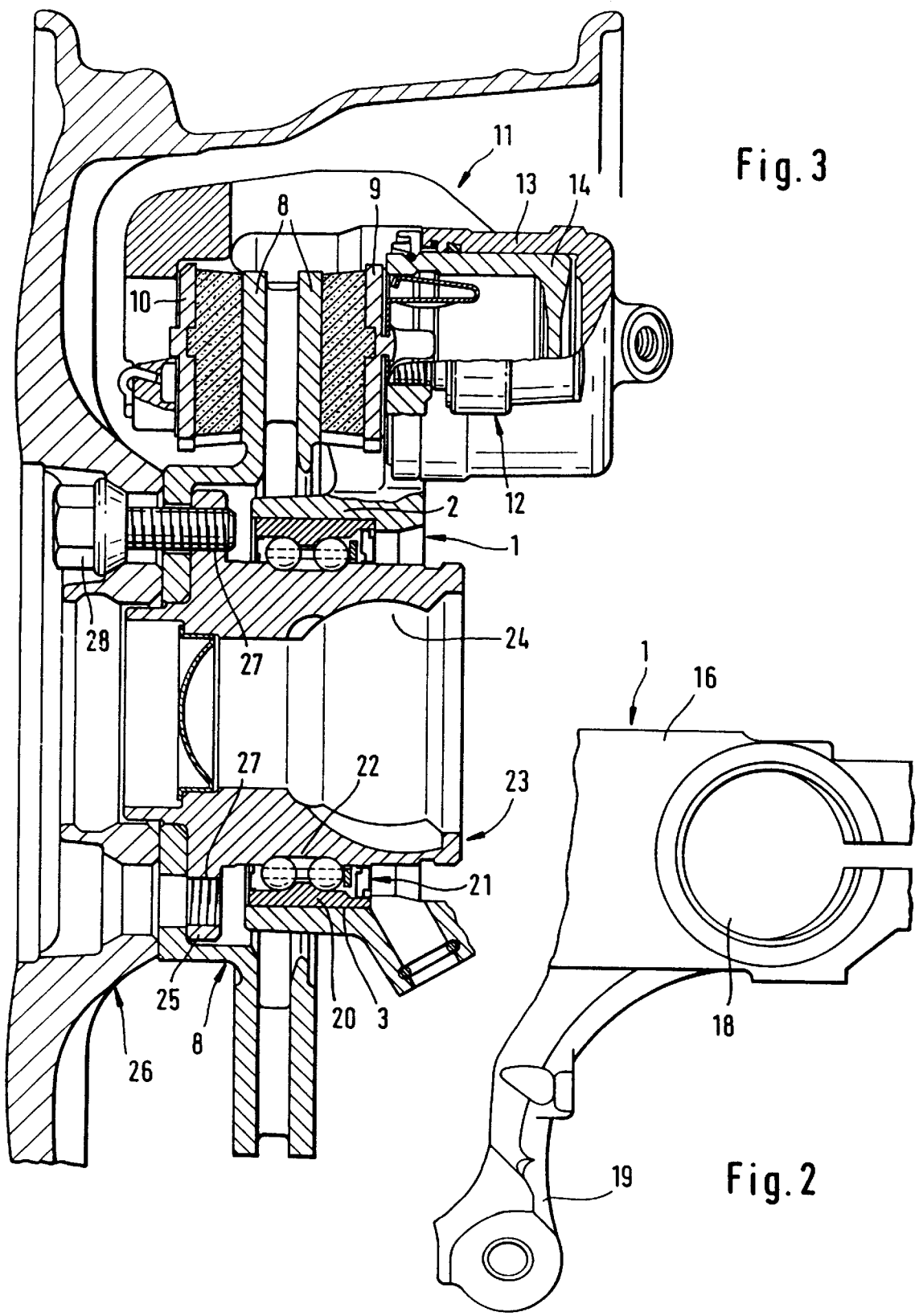
FIG. 2 is a partial view of the casting in the direction A in FIG. 1.
FIG. 3 is a predominantly cross-sectional view, taken along line B—B in FIG. 1, of a readily assembled steering knuckle assembly including the rotating parts and the wheel rim.

Two brake pads 9, 10 arranged on either side of the brake disc 8 are axially slidably guided on the guiding portions 6, 7. As can best be seen in FIG. 3, a floating caliper 11 is attached to the carrier component 1 by way of two pin guides 12 and is also guided so as to be slidable in an axial direction. The floating caliper 11 straddles the external edge of the brake disc 8 and the two brake pads 9, 10 in a tong-type manner. On the axially internal side, a brake cylinder 13 with a brake piston 14 is arranged which acts directly on the internal brake pad 9 when the brake is applied. When the brake pad 9 is urged against the brake disc 8, the floating caliper 11 displaces in its pin guides 12 due to the reaction force until the external brake pad 10 is urged against the other side of the brake disc 8. Only the clamping force required for application of the brake pads 9, 10 is transmitted from the floating caliper 11. The circumferential forces which develop during braking due to friction are transmitted from the brake pads 9, 10 directly to the guiding portions 6, 7 of the supporting arms 4, 5.

The carrier component 1 has two differently large fastening sections 15, 16 which, emerging from the central section 2, extend substantially in opposite directions. Each of the fastening sections 15, 16 has an eyelet 17, 18 for attachment to the wheel suspension, the larger eyelet 18 of the larger fastening section 6 being visible in FIG. 2 only. Further, the carrier component 1 has a lever 19 which, starting from the central section 2, extends substantially in a radial direction remote from the disc brake and is intended for coupling to a steering linkage of the vehicle.

The carrier component 1 is made of one single casting, and the supporting arms 4, 5, the fastening sections 15, 16 and the lever 19 are integrally designed with the central section 2.

An external ring 20 of a wheel axle bearing 21 is pressed into the central bore 3 of the carrier component 1. An internal ring 22 of the wheel axle bearing 21 is formed integrally with the wheel axle 23. The bowl shaped part 24 of a constant-velocity joint is integrally formed on the inner side of the wheel axle 23 and is coupled to and driven by a drive shaft (not shown) through the wheel axle. A flange 25 for attaching the brake disc 8 and a wheel rim 26 is formed integrally with the wheel axle 23.

Thus, the rotatably mounted, integral wheel axle member described performs the functions of the wheel axle 23 of the internal ring 22 of a wheel axle bearing 21, of the one bowl shaped part of a constant-velocity joint and of the flange 25 for the attachment of a brake disc 8 and wheel rim 26. Advantageously, this eliminates the need for the coupling elements and manufacturing steps otherwise required for coupling the mentioned functional parts.

Flange 25 includes threaded bores 27 into which wheel lug bolts 28 are screwed serving to rigidly connect both the wheel rim 26 and the brake disc 8 with the flange 25.

The provision of the carrier component 1 and the wheel axle 23 as combination component parts is particularly effective for rendering the weight of the steering axle assembly favorably light and permits manufacture at relatively low costs. A special advantage is achieved by the present invention when the carrier component 1 with the disc brake 11 and the wheel axle bearing 21 along with the wheel axle 23, comprising the flange 25 and the shell-shaped part 24, and the brake disc 8 are coupled to form a module provided as a preassembled unit for the final assembly of the automotive vehicle. In this case, all assembly operations necessary for the assembly of the module can be carried out in the plant of a subsupplier, and the final assembly can be effected requiring minimal effort and equipment.

We claim:

1. A steering knuckle assembly, for drive wheels of automotive vehicles, including
    a carrier component adapted to be attached to a wheel suspension, wherein the carrier component is a one-piece member having a central section and two integral supporting arms extending radially outwardly from said central section,
    a floating caliper disc brake and a wheel axle bearing attached to said carrier component, the disc brake including a floating caliper, a brake disc and two brake pads,
    a wheel axle rotatably mounted to said carrier component which has a flange for the attachment of the brake disc, comprising:
    a bowl-shaped part in said wheel axle,
    wherein the carrier component, the disk brake and the wheel axle bearing along with the wheel axle, the flange, and the bowl-shaped part are coupled to form a preassembled unit and wherein said integral supporting arms are deflected in an axial direction, each projecting with an axial guiding portion beyond the brake disc and guiding the brake pads, thereby leaving the brake pads axially slidable.

2. A steering knuckle assembly as claimed in claim 1, further including a radially external ring of the wheel axle bearing, wherein said radially external ring is pressed into a central bore of the carrier component.

3. A steering knuckle assembly as claimed in claim 1, further including a radially internal ring of the wheel axle bearing which is formed integrally with the wheel axle.

4. A steering knuckle assembly as claimed in claim 3, wherein the bowl shaped part of the constant-velocity joint is formed integrally with the wheel axle.

5. A steering knuckle assembly as claimed in claim 3, wherein the flange for the attachment of the brake disc is formed integrally with the wheel axle, the flange including threaded bores and the brake disc being fixed by bolts.

6. A steering knuckle assembly as claimed in claim 1, wherein the carrier component includes at least one fastening section with an eyelet for attachment to the wheel suspension.

7. A steering knuckle assembly as claimed in claim 6, wherein the fastening section is integrally formed on the carrier component.

8. A steering knuckle assembly as claimed in claim 1, wherein the carrier component has a lever for steering the vehicle wheel.

9. A steering knuckle assembly as claimed in claim 8, wherein the lever is formed integrally with the carrier component.

10. A steering knuckle assembly as claimed in claim 1, wherein the carrier component is made of a casting on which the supporting arms for the disc brake, a fastening section for the wheel suspension and a lever for steering are integrally formed.

* * * * *